(12) United States Patent
Ito et al.

(10) Patent No.: US 6,817,660 B2
(45) Date of Patent: Nov. 16, 2004

(54) VEHICLE REAR STRUCTURE

(75) Inventors: Takahiro Ito, Wako (JP); Ryosuke Nakashima, Wako (JP); Hirobumi Kikuchi, Wako (JP); Masami Kawaguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/653,346

(22) Filed: Sep. 2, 2003

(65) Prior Publication Data

US 2004/0041431 A1 Mar. 4, 2004

(30) Foreign Application Priority Data

Sep. 4, 2002 (JP) .................................... 2002-259271

(51) Int. Cl.⁷ .............................................. B60N 2/36
(52) U.S. Cl. .................... 297/15; 297/331; 297/335; 297/336; 297/378.1; 297/378.12; 296/65.09; 296/66
(58) Field of Search ......................... 297/15, 331, 335, 297/336, 378.1, 378.12, 378.14; 296/65.09, 66

(56) References Cited

U.S. PATENT DOCUMENTS 5,658,046 A * 8/1997 Rus ......................... 297/378.1
5,795,023 A * 8/1998 Kayumi ...................... 297/331
5,941,602 A * 8/1999 Sturt et al. ............. 297/378.1 X
5,971,467 A * 10/1999 Kayumi et al. ................ 296/66
6,099,072 A * 8/2000 Sturt et al. ..................... 297/15
6,106,046 A * 8/2000 Reichel .................... 296/65.09
6,113,187 A * 9/2000 Sugiyama et al. .......... 297/335
6,416,107 B1 * 7/2002 Kanaguchi et al. ...... 296/65.09
6,536,843 B1 * 3/2003 Severinski et al. ..... 297/378.12
6,648,395 B2 * 11/2003 Hoshino ....................... 296/66
6,663,179 B2 * 12/2003 Sunohara ................ 296/331 X
6,682,120 B2 * 1/2004 Kamida et al. .......... 296/65.09
6,746,083 B2 * 6/2004 Drew et al. ............. 297/378.12
2002/0033623 A1 * 3/2002 Sunohara ..................... 297/331
2002/0140270 A1 * 10/2002 Hoshino ................... 297/378.1

FOREIGN PATENT DOCUMENTS

JP        58039535 A  *  3/1983   ............... 296/65.09
JP        HEI-5-46588      6/1993

* cited by examiner

*Primary Examiner*—Rodney B. White
(74) *Attorney, Agent, or Firm*—Rankin, Hill, Porter & Clark LLP

(57) ABSTRACT

A vehicle rear structure is provided in which, when a seatback is tilted forward and folded, an upper surface of the seatback and a rear floor positioned behind the seat form a flat surface. A bridge plate is extended between the folded seatback and the rear floor. The bridge plate is rotatably attached to the front edge of the rear floor. A portion for lifting a front edge portion of the bridge plate in conjunction with the uprising movement of the seatback is provided at the rear of the seatback to prevent the seatback from getting stuck on the front edge portion of the bridge plate.

6 Claims, 13 Drawing Sheets

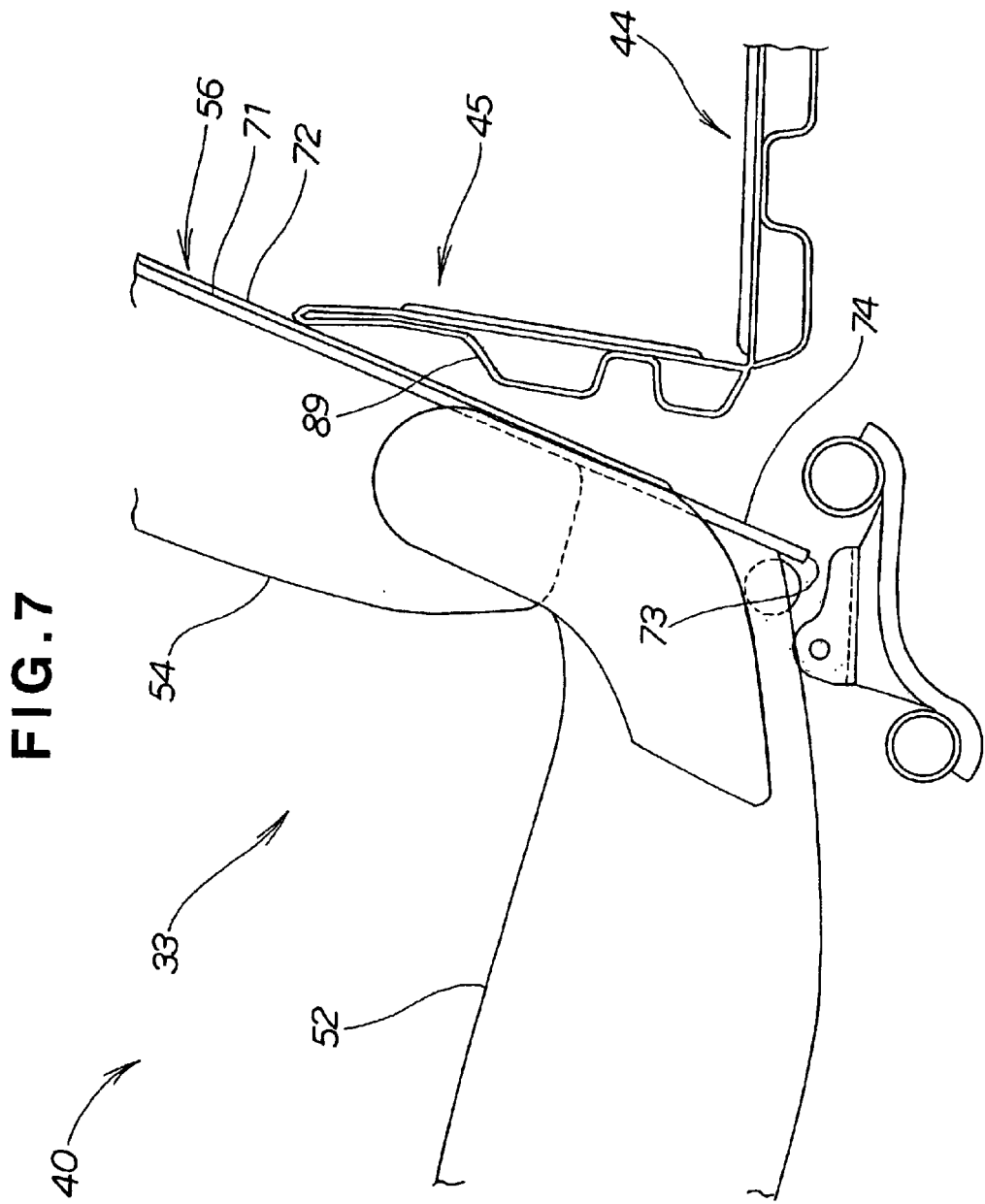

VEHICLE REAR STRUCTURE

FIELD OF THE INVENTION

The present invention relates to a vehicle rear structure in which, when a seatback is folded, a rear floor and an upper surface of the seatback provide a flat surface.

BACKGROUND OF THE INVENTION

A vehicle rear structure in which an upper surface of a seatback folded and a rear floor form a flat surface is disclosed in, for example, Japanese Utility Model Laid-Open Publication No. HEI-5-46588. This rear structure will be described with reference to FIGS. 14A and 14B hereof.

A vehicle rear structure 100 shown in FIG. 14A has a seat cushion 108 mounted on a vehicle floor 104, a seatback 109 mounted to the seat cushion 108 in a foldable manner, a spare tire well 103 provided in the vehicle floor 104 behind the seatback 109 for housing a spare tire 106, and a cover member 107 covering the spare tire 106 and an unoccupied space 105 between the spare tire well 103 and the seatback 109.

In the vehicle rear structure 100, if the seat cushion 108 is longitudinally slidably mounted on the vehicle floor 104, for example, a gap will be formed between the rear of the seat cushion 108 and the front edge of the cover member 107. Through the gap, objects loaded on the cover member 107 can fall into the unoccupied space 105.

Then, in some cases, as in a vehicle rear structure 110 shown in FIG. 14B, a bridge plate 118 is rotatably attached to the front edge of a cover member 117 so that the front edge of the bridge plate 118 abuts on the rear of a seatback 109.

In the vehicle rear structure 110 shown in FIG. 14B, when the seatback 109 is folded onto a seat cushion 108 as shown by arrow î, the bridge plate 118 can move along the seatback 109 into a horizontal position as shown by arrow 2̂. However, when the seatback 109 is raised from the seat cushion 108, the front edge of the bridge plate 118 can get stuck on the seatback 109, preventing the seatback 109 from being raised. Therefore desired is a structure which permits a bridge plate 118 rotatably attached to a cover member 117, the front edge of which bridge plate 118 is made to abut on the rear surface of a seatback 109, to smoothly move with the folding and uprising movements of the seatback 109.

SUMMARY OF THE INVENTION

According to the present invention, there is provided a vehicle rear structure, which comprises: a seatback; a rear floor positioned behind the seatback and designed to be on the same level as an upper surface of the seatback when the seatback is folded forwardly; and a bridge plate rotatably attached to the rear floor to extend onto the upper surface of the folded seatback, the folded seatback having on the upper surface an area for receiving a front edge portion of the bridge plate and having at a rear portion thereof a portion for lifting the front edge portion of the bridge plate in conjunction with uprising movement of the seatback, the bridge plate having on an undersurface thereof a cam with which the lifting portion comes into contact.

In a vehicle rear structure in which, when a seatback is folded, a rear floor and an upper surface of the seatback form a flat surface and a bridge plate is extended between the upper surface of the seatback and the rear floor, it is convenient to move the bridge plate in conjunction with the folding movement and uprising movement of the seatback. The upper surface of the seatback, however, is not necessarily configured to be a flat surface.

Then, the seatback is provided at its rear portion with the portion for lifting the front edge of the bridge plate in conjunction with the uprising movement of the seatback and the bridge plate is provided at its undersurface with the cam to make contact with the portion, so that, to raise the seatback, the front edge portion of the bridge plate is first lifted to prevent the seatback from being stuck by the front edge portion of the bridge plate. This smoothes the folding and uprising movements of the seatback.

Preferably, the rear floor has a recess for housing a spare tire and a lid for closing the recess, and the bridge plate is provided at a front edge of the lid. Cargo can thus be loaded on the lid over the housed spare tire, resulting in an effective use of the rear floor.

BRIEF DESCRIPTION OF THE DRAWINGS

A preferred embodiment of the present invention will be described in detail below, by way of example only, with reference to the accompanying drawings, in which:

FIG. 7 is an enlarged view illustrating the relationship between the vehicle seat and a bridge plate in the rear structure shown in FIG. 2;

DETAILED DESCRIPTION OF THE PREFERRED EMBODIMENT

Figure 1:
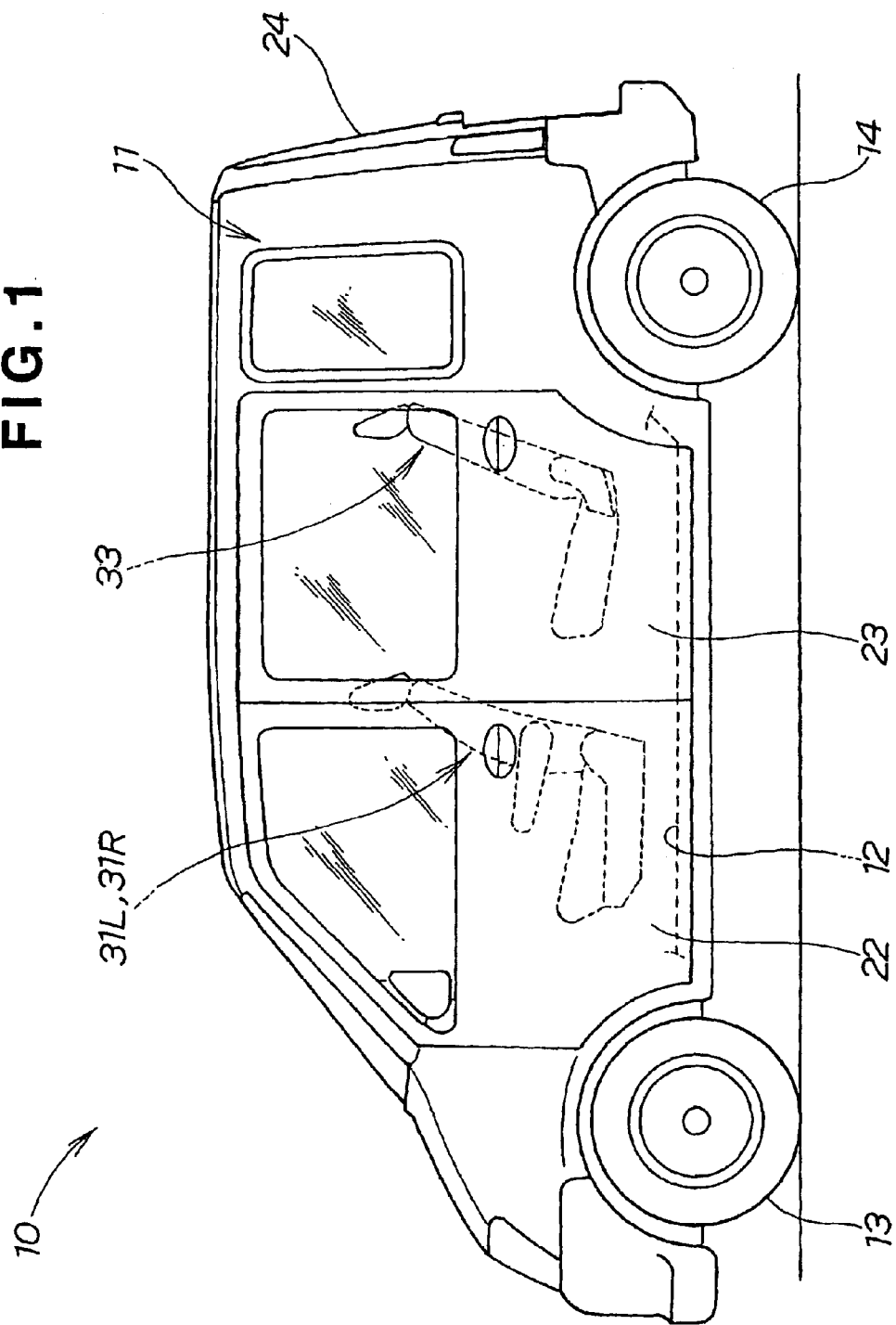
FIG. 1 is a side view of a vehicle employing a vehicle rear structure according to the present invention.

In FIG. 1, reference numeral 10 denotes a vehicle, 11 a vehicle body, 12 a vehicle floor, 13 a front wheel, 14 a rear wheel, 22 a front side door, 23 a rear side door, and 24 a tailgate. The vehicle 10 has a first row of left and right seats 31L, 31R and a second row seat 33, allowing various seat arrangements.

The right seat 31R in the first row is a driver seat and the left seat 31L in the first row is a front passenger seat. The second row seat 33 is foldable and also movable in a forward and downward direction. A vehicle rear structure according to the present invention is, as described below, a vehicle structure behind the second row seat 33 (hereinafter referred to as a "vehicle seat 33") and will be described below.

Figure 2:
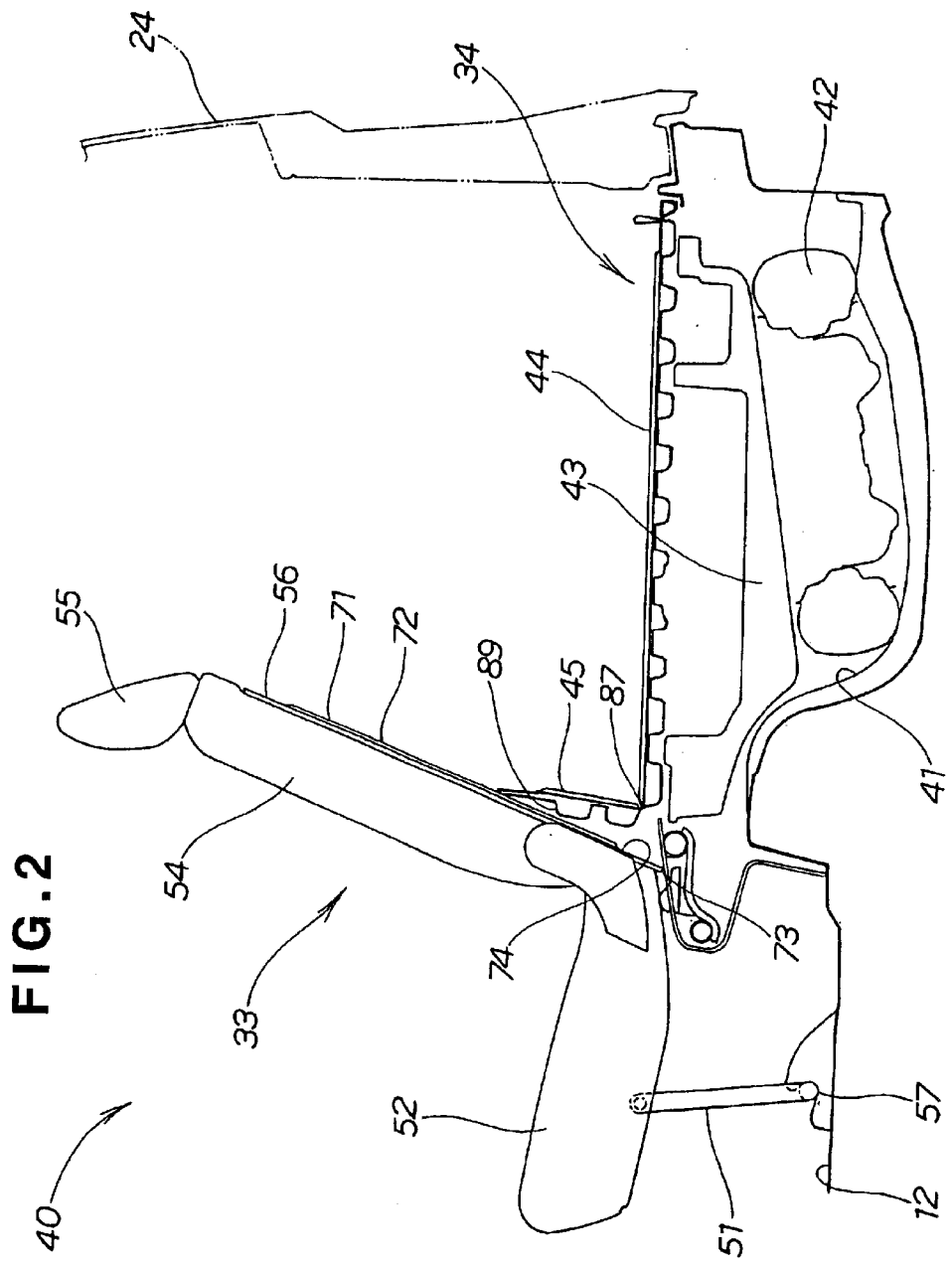
FIG. 2 is a side view of the vehicle rear structure according to the present invention.

A vehicle rear structure 40 of the present invention is shown in FIG. 2. The vehicle seat 33 is mounted on the vehicle floor 12 in a forwardly and downwardly swingable manner. A housing recess 41 for housing a spare tire 42 is provided in a rear floor 34 behind the vehicle seat 33. A pad 43 is placed on the spare tire 42 and a lid portion 44 is laid over the pad 43. A bridge plate 45 is rotatably attached to the front edge of the lid portion 44. The front edge of the bridge plate 45 abuts on a rear surface of the vehicle seat 33.

Cargo is loaded on the lid portion 44 provided on the rear floor 34 to effectively utilize the rear floor 34.

The relationship between a seatback 54 and the bridge plate 45 is shown in detail in FIG. 7 in an enlarged view.

Figure 3:
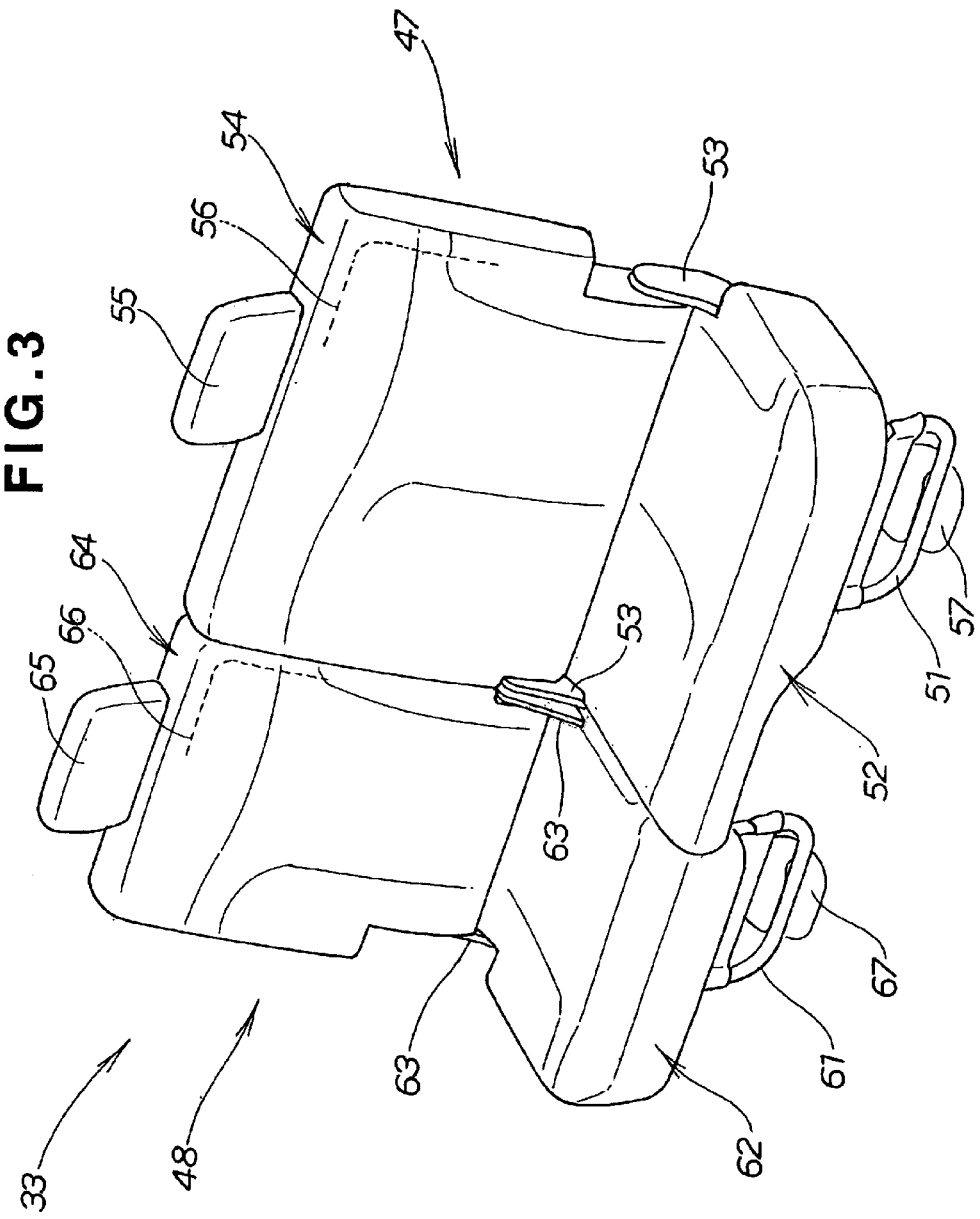
FIG. 3 is a perspective view of a vehicle seat shown in FIG. 2.

As shown in FIG. 3, the vehicle seat 33 consists of a left seat 47 and a right seat 48.

The left seat 47 includes a seat cushion 52 mounted via a link 51 on the vehicle floor 12 shown in FIG. 2 in a forwardly and downwardly swingable manner, a seatback 54 mounted on the seat cushion 52 via hinges 53, 53 in a foldable manner, a headrest 55 mounted on the seatback 54 in a height-adjustable manner, and a loading plate 56 mounted to a back surface of the seatback 54 to serve as a cargo loading surface when folded. Reference numeral 57 denotes a supporting member provided on the vehicle floor 12 (see FIG. 2) for rotatably supporting the link 51.

The fright seat 48 is a narrow seat configured substantially the same as the left seat 47. Reference numeral 61 denotes a link, 62 a seat cushion, 63, 63 hinges, 64 a seatback, 65 a headrest, 66 a loading plate, and 67 a supporting member.

Figure 4:
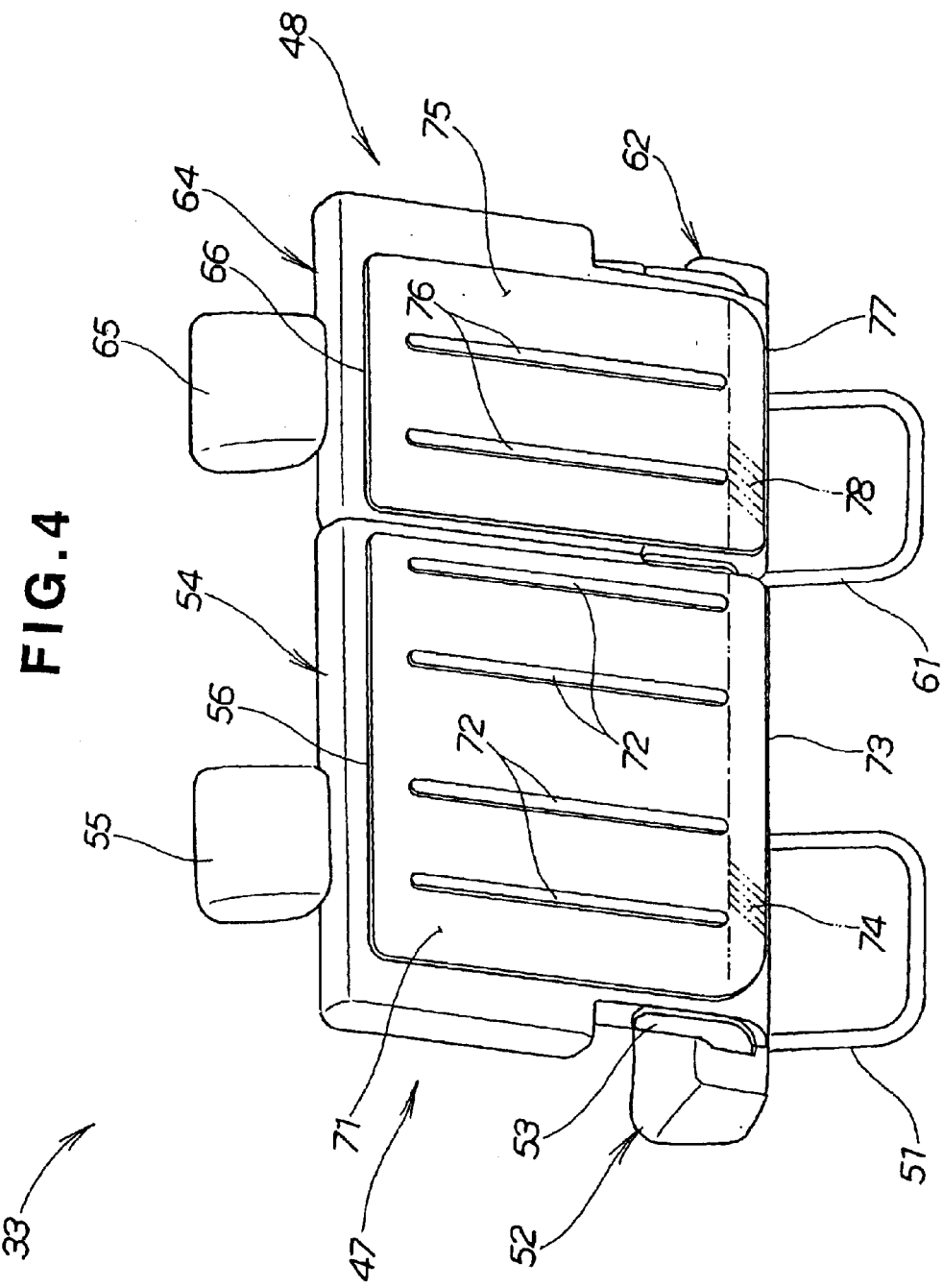
FIG. 4 is a perspective view of the vehicle seat viewed from behind.

FIG. 4 illustrates the back surface of the vehicle seat 33 consisting of the left seat 47 and the right seat 48.

Referring to FIG. 4, the left loading plate 56 has a body 71 covering the back surface of the seatback 54, a plurality of protruding rails 72 formed on the body 71 for facilitating cargo loading and unloading, an edge portion 73 as the lower edge of the body 71 to abut on the bridge plate 45 shown in FIG. 2 for lifting the bridge plate 45, and a bridge plate receiving area 74. The bridge plate receiving area 74 is an L-shaped step shown in FIG. 2, formed by the body 71 and the rails 72.

The right loading plate 66 is a narrow plate member configured substantially the same as the left loading plate 56. Reference numeral 75 denotes a body covering the back surface of the seatback 64, 76, 76 rails, 77 an edge portion, and 78 a bridge plate receiving area of an L-shaped step.

Figure 5:
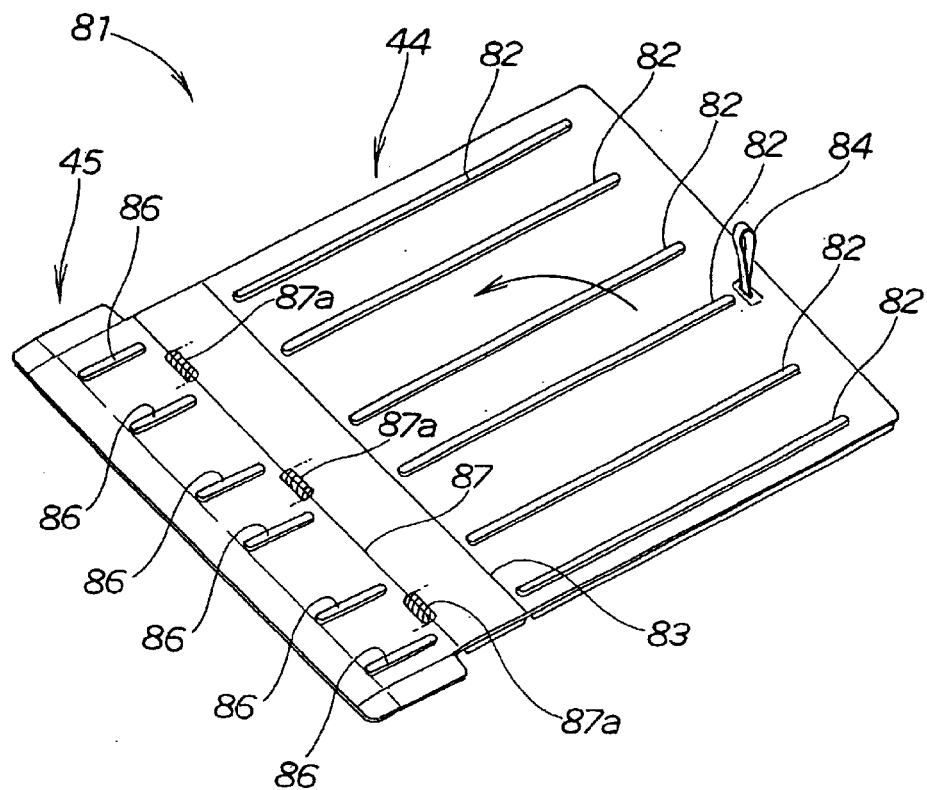
FIG. 5 is a perspective view of a lid portion shown in FIG. 2.
Figure 6:
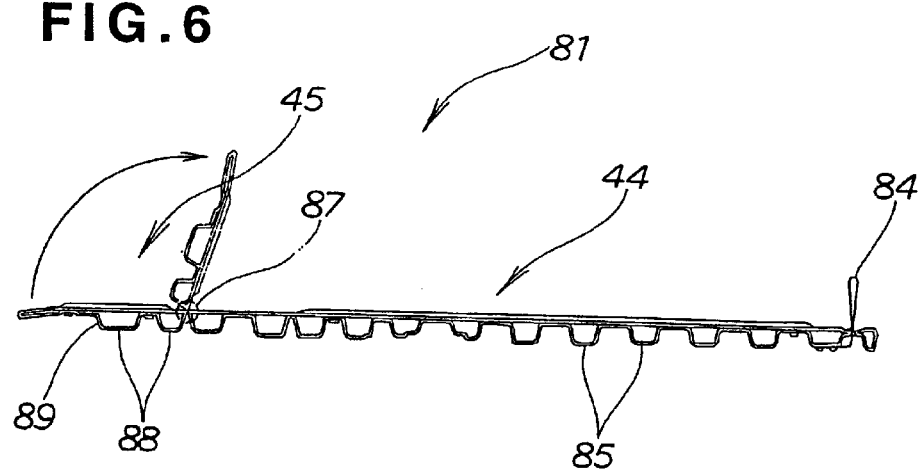
FIG. 6 is a side view of a lid.

FIGS. 5 and 6 illustrate a lid 81 according to the present invention.

The lid 81 includes the lid portion 44 for covering the spare tire 42 shown in FIG. 2 and the bridge plate 45 rotatably attached to the front of the lid portion 44 via a first hinge 87.

The lid portion 44 has a plurality of protruding rails 82 for facilitating cargo loading and unloading, a second hinge 83 for allowing bending from its forward midsection, a strap 84 for lifting its rear portion, and a plurality of reinforcements 85 shown in FIG. 6 attached to its rear surface. The lid portion 44 is lifted upward by hand with the strap 84 as shown by an arrow about the second hinge 83 to open the housing recess 41 housing the spare tire 42 shown in FIG. 2.

The bridge plate 45 has a plurality of protruding rails 86 for facilitating cargo loading and unloading, a plurality of torsion springs 87a for biasing the bridge plate 45 rotated in the direction shown by an arrow in FIG. 6 toward the returning direction, a plurality of reinforcements 88 attached to the rear surface as shown in FIG. 6, and a plurality of cams 89 (only one is shown) provided at the reinforcements 88 to be engaged with the edge portion 73 (see FIG. 4). The torsion springs 87a are provided at the first hinge 87. The cams 89 are front tapered portions of the reinforcements 88.

A method of using the above-described vehicle rear structure 40 will be described with reference to FIGS. 8A to 13B.

Figure 8A:
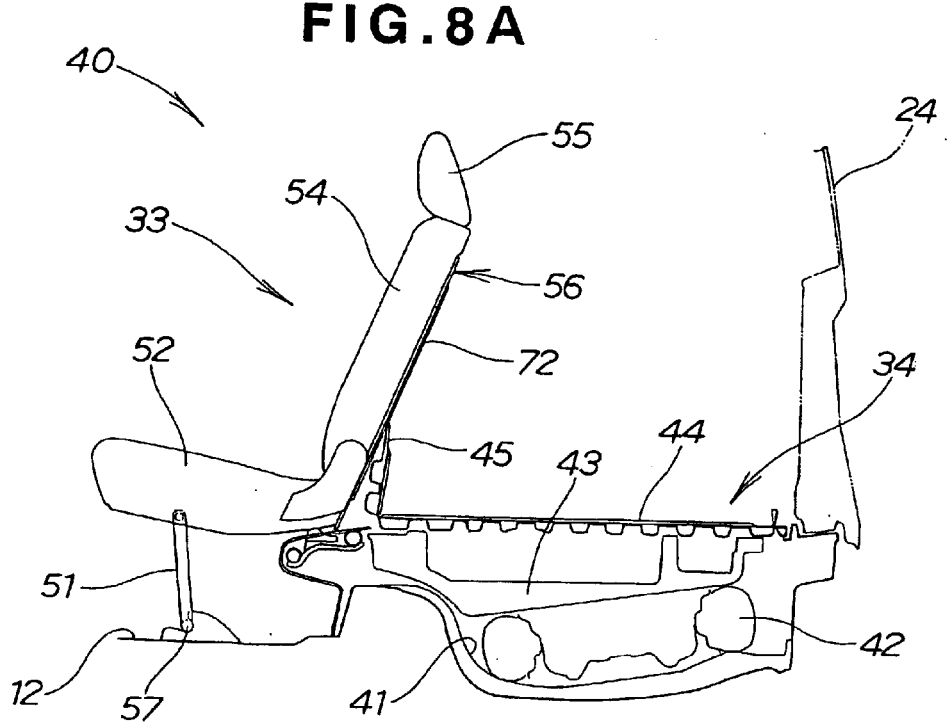
FIGS. 8A and 8B are diagrams illustrating a state before a seatback is folded.

FIG. 8A illustrates the vehicle seat 33 in an occupiable state.

Figure 8B:
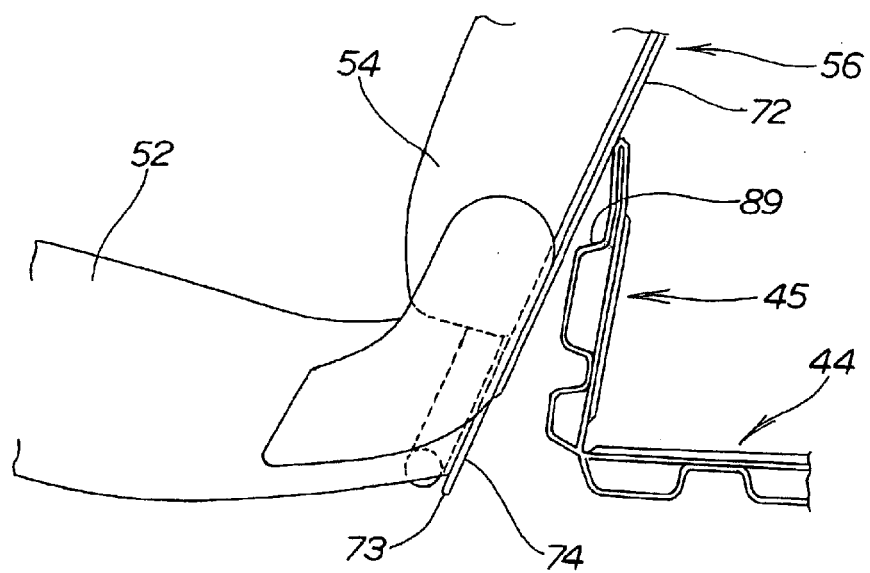

FIG. 8B illustrates the front edge of the bridge plate 45 abutting on the rails 72 of the loading plate 56.

Figure 9A:
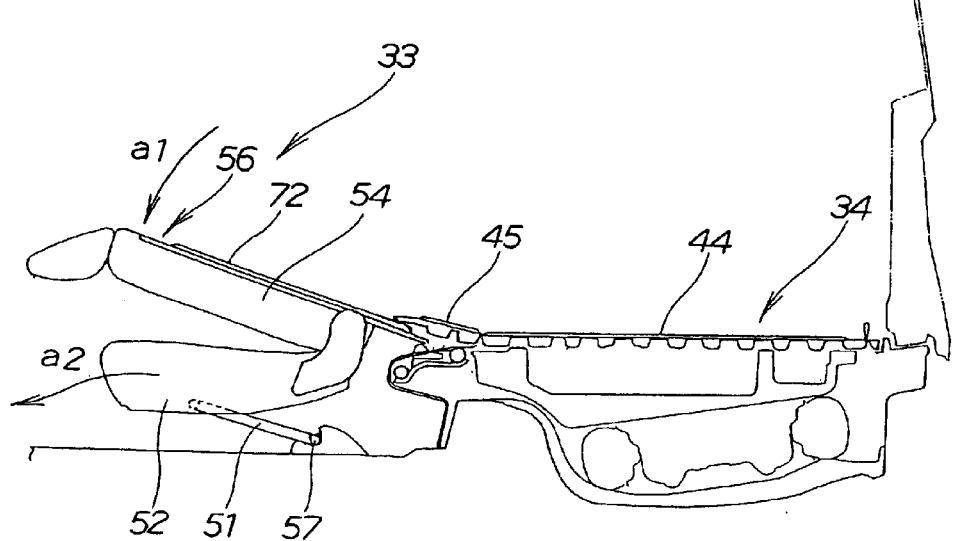
FIGS. 9A and 9B are diagrams illustrating a state during the movement of a seat cushion in a forward and downward direction while the seatback is being folded.

In FIG. 9A, when the seatback 54 is folded forward as shown by arrow a1, the seat cushion 52 moves in a forward and downward direction as shown by arrow a2 on the supporting member 57 via the link 51.

Figure 9B:
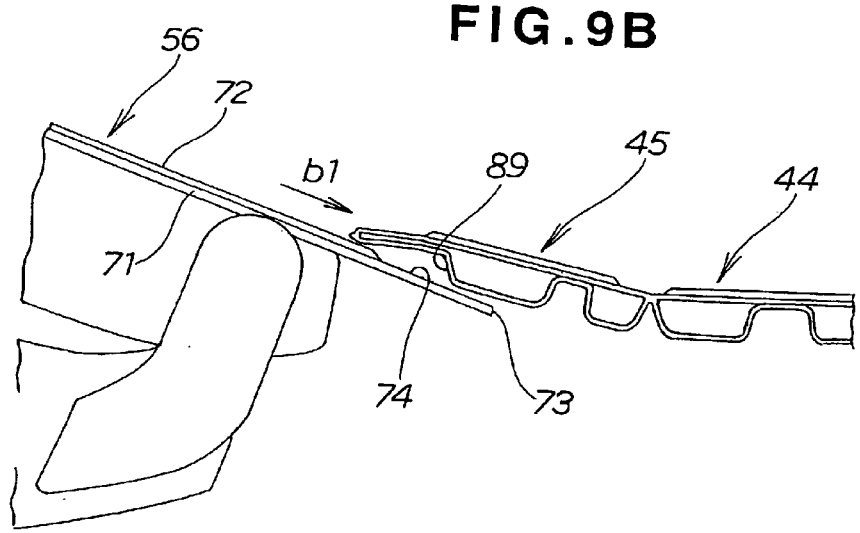

As shown in FIG. 9B, the front edge of the bridge plate 45 slides on the rails 72 as shown by arrow b1 toward the bridge plate receiving area 74 formed at a lower edge portion of the loading plate body 71.

Figure 10A:
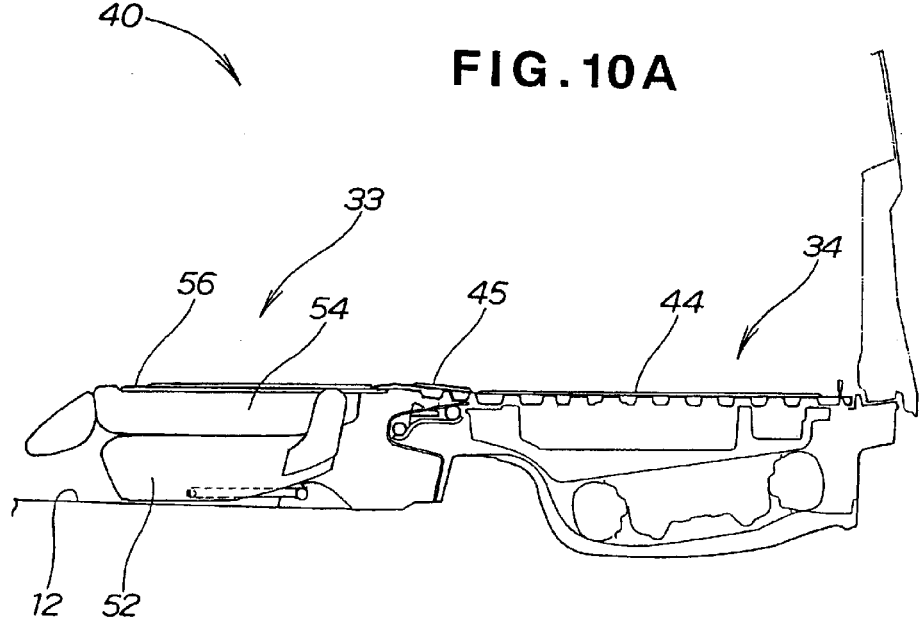
FIGS. 10A and 10B are diagrams illustrating a state in which the seatback is fully folded and a rear surface of the seatback and a rear floor form a flat surface.

In FIG. 10A, when the seatback 54 is fully folded, the vehicle seat 33 is stowed in the vehicle floor 12. The loading plate 56 on the seatback 54, the bridge plate 45 and the lid portion 44 form a substantially flat (coplanar) rear floor 34.

Figure 10B:
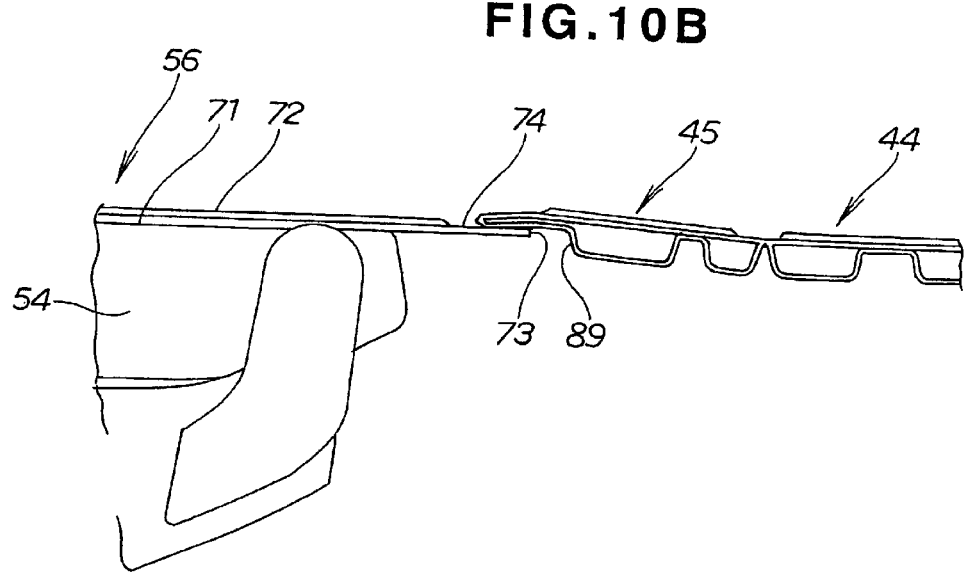

In FIG. 10B, a front edge portion of the bridge plate 45 is received in the bridge plate receiving area 74 (a portion of an L-shaped step in a side view formed by the loading plate body 71 and the rails 72). That is, the bridge plate 45 extends across the gap between the loading plate 56 provided on the back surface of the seatback 54 and the lid portion 44.

Figure 11A:
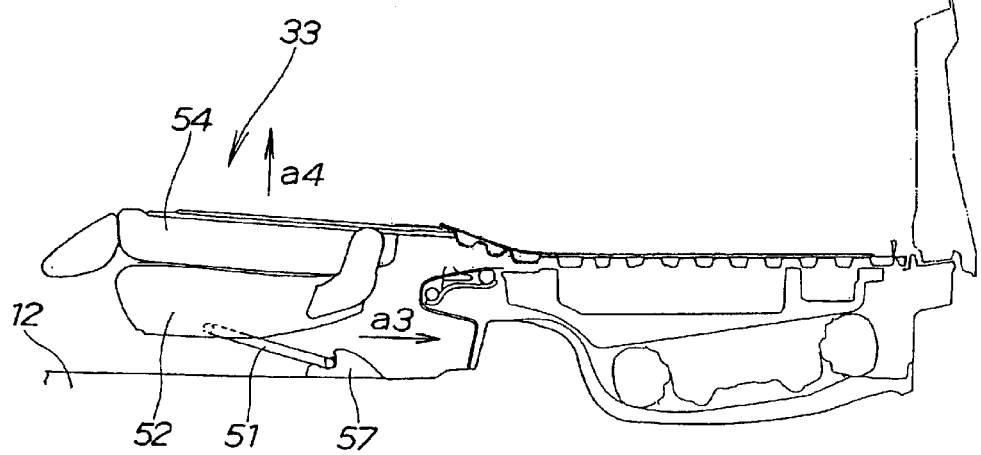
FIGS. 11A and 11B are diagrams illustrating a state in which, to raise the folded seatback, the seatback and the seat cushion are lifted a little upward while being moved slightly rearward.

Then, to raise the seatback 54 shown in FIG. 10A from the folded state, the folded seat cushion 52 and seatback 54 are moved rearward as shown by arrow a3 in FIG. 11A. At that time, the seat cushion 52 and the seatback 54, which are mounted on the vehicle floor 12 rotatably on the supporting member 57 via the link 51, also move upward as shown by arrow a4.

Figure 11B:
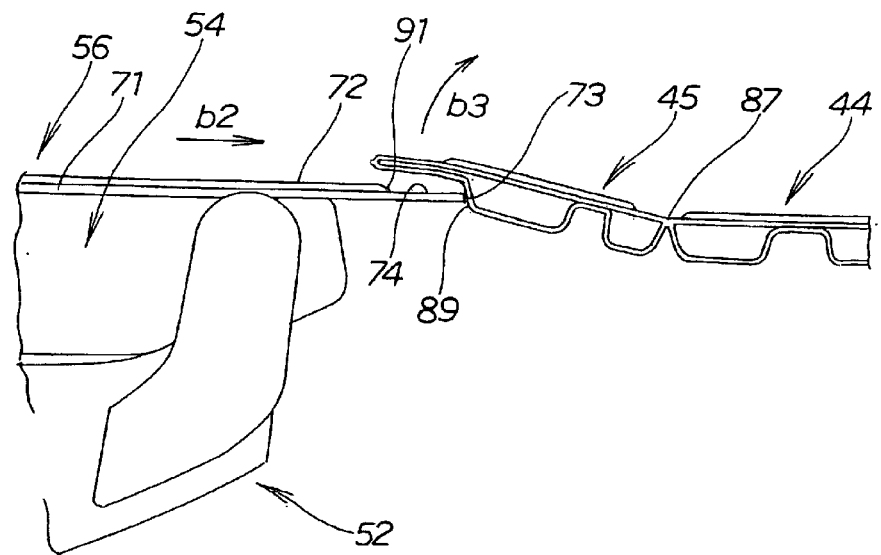

As shown in FIG. 11B, when the folded seat cushion 52 and seatback 54 are further moved as shown by arrow b2, the edge portion 73 of the loading plate 56 impacts the cams 89 of the bridge plate 45, sliding along the cams 89, and rotating the bridge plate 45 as shown by arrow b3. As a result, the front edge of the bridge plate 45 is located above the rails 72 of the loading plate 56.

In summary, the edge portion 73 for lifting the front edge portion of the bridge plate 45 with the uprising movement of the seatback 54 is provided at the back surface of the seatback 54 and the cams 89 with which the edge portion 73 comes into contact is provided on the undersurface of the bridge plate 45 so that the front edge of the bridge plate 45 is first lifted when the seatback 54 is raised. The front edge portion of the bridge plate 45 is thus prevented from being caught by end portions 91 of the rails 72.

Accordingly, the bridge plate 45 can be moved in conjunction with the folding and uprising movements of the seatback 54, resulting in smooth movements.

Figure 12A:
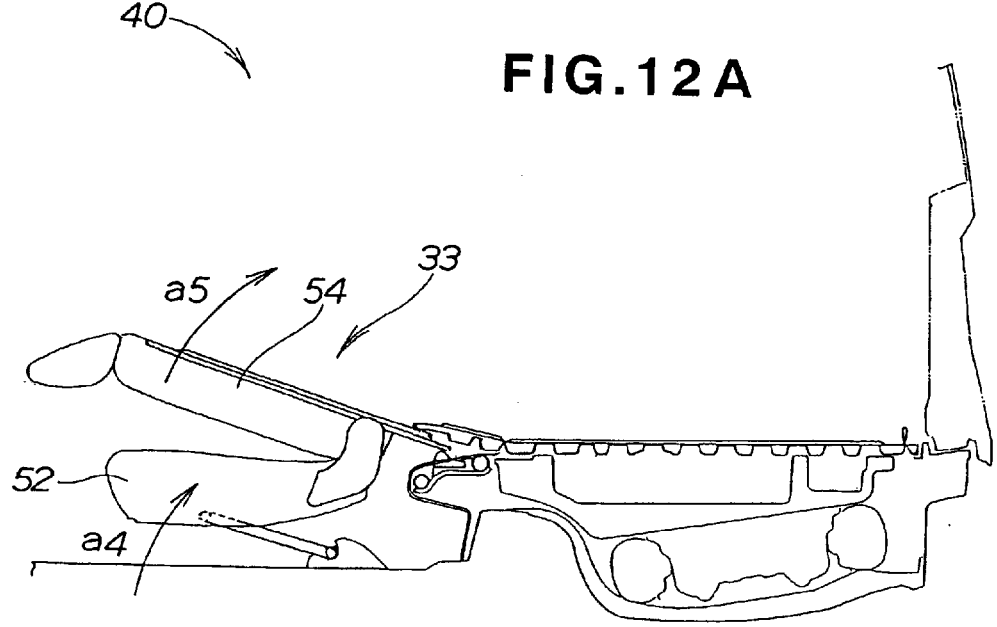
FIGS. 12A and 12B are diagrams illustrating that, during the raising of the seatback, a front edge portion of the bridge plate is not caught on the seatback.

In FIG. 12A, while the seat cushion 52 is being lifted as shown by arrow a4, the seatback 54 is raised as shown by arrow a5.

Figure 12B:
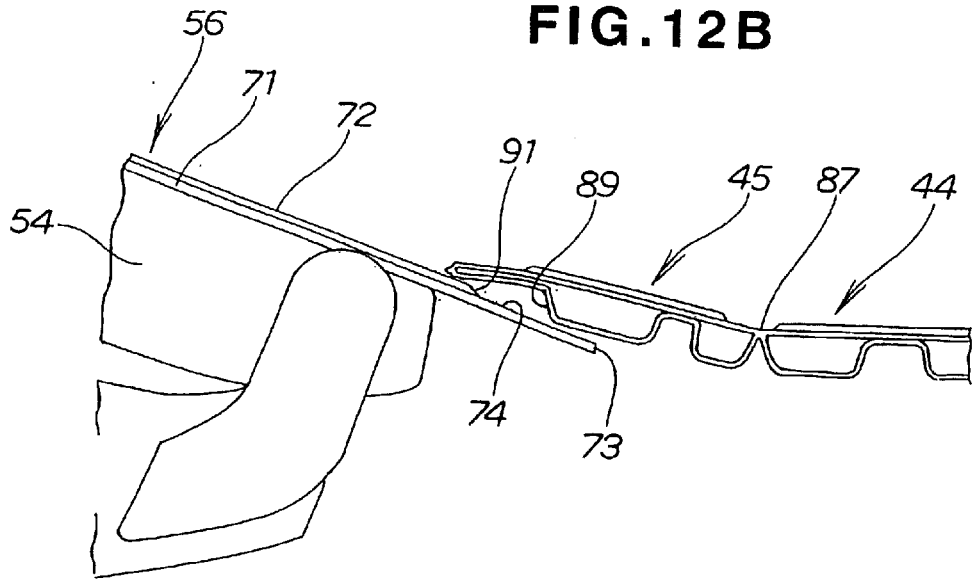

In FIG. 12B, the front edge portion of the bridge plate 45, which has already been located on the rails 72 of the loading plate 56, is not caught by the end portions 91 of the rails 72 when the seatback 54 is further raised.

Figure 13A:
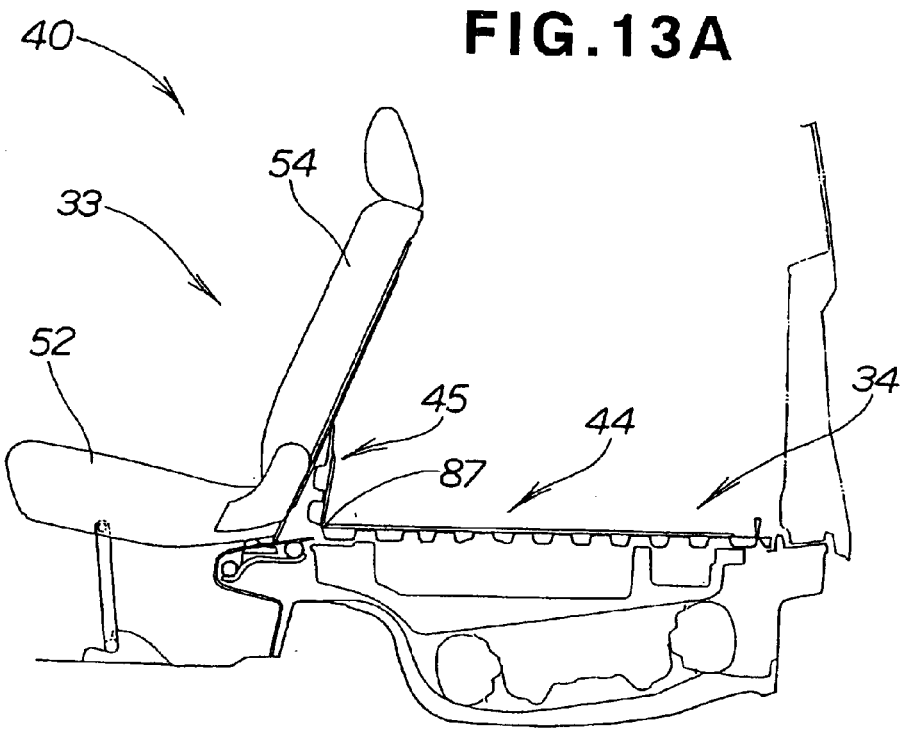
FIGS. 13A and 13B are diagrams in which the seatback having been folded is fully raised into an original state.

In FIG. 13A, the seatback 54 is further raised and the seat cushion 52 is further lifted, the vehicle seat 33 is returned to an occupiable state.

Figure 13B:
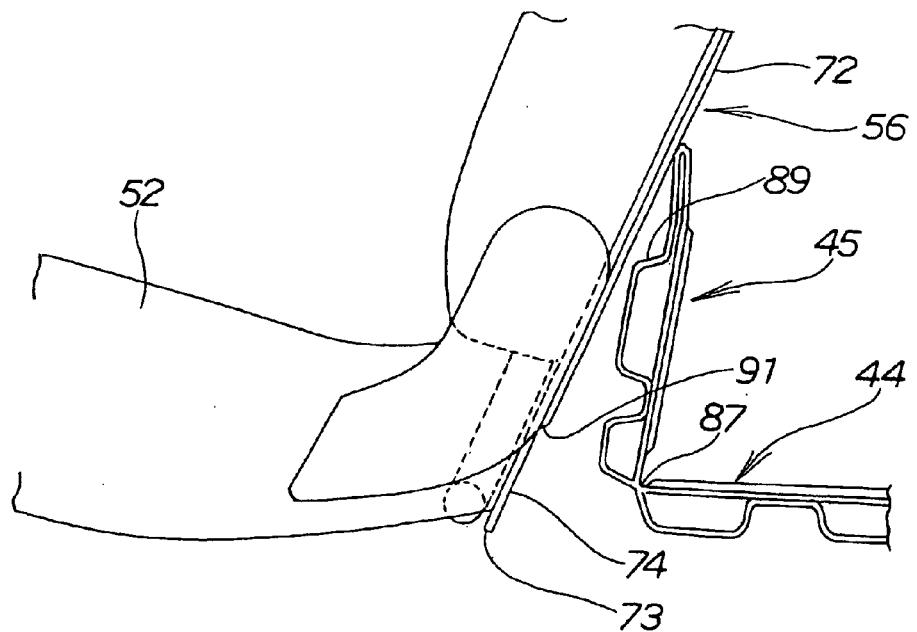
Figure 14A:
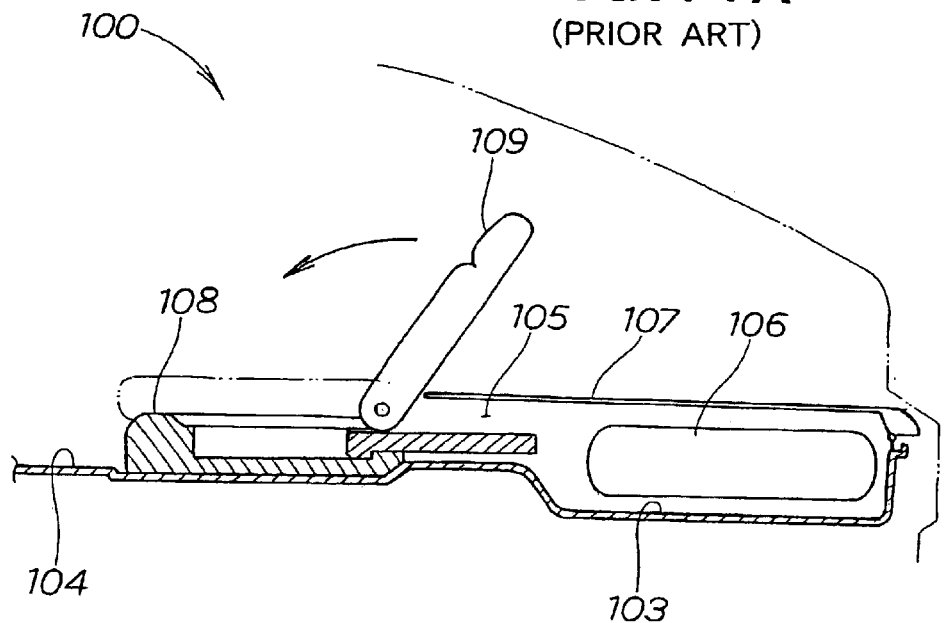
FIGS. 14A and 14B are schematic diagrams of conventional vehicle rear structures.
Figure 14B:
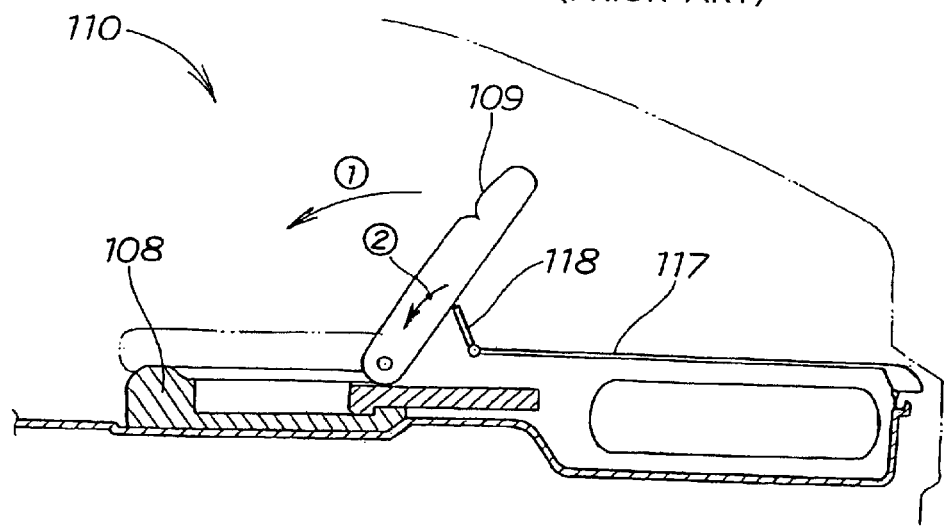

As shown in FIG. 13B, the front edge portion of the bridge plate 45 is returned without getting stuck on the end portions 91 of the rails 72.

The vehicle seat 33 in this embodiment as shown in FIG. 2 has been described with the example in which the seat cushion 52 moves on the supporting member 57 in a forward and downward direction in conjunction with the folding of the seatback 54, which is not limiting. It is also possible to only fold the seatback 54 without moving the seat cushion 52.

Obviously, various minor changes and modifications of the present invention are possible in the light of the above teaching. It is therefore to be understood that without departing from the appended claims, the invention may be practiced otherwise than as specifically described.

What is claimed is:

1. A vehicle rear structure, comprising:

a seatback;

a rear floor positioned behind the seatback and designed to be on the same level as an upper surface of the seatback when the seatback is folded forward; and a bridge plate rotatably attached to the rear floor to extend onto the upper surface of the folded seatback;

the folded seatback having on the upper surface an area for receiving a front edge portion of the bridge plate and having at a rear portion thereof a portion for lifting the front edge portion of the bridge plate in conjunction with uprising movement of the seatback during reconfiguration of the seatback for passenger seating;

the bridge plate having a cam on an undersurface thereof, said cam being spaced from the lifting portion when the seatback is folded forward and with which the lifting portion temporarily comes into sliding contact during reconfiguration of the seatback for passenger seating.

2. A rear structure according to claim 1, wherein the rear floor has a recess for housing a spare tire, and a lid for closing the recess, and the bridge plate is provided at a front edge of the lid.

3. The rear structure of claim 1 wherein the lifting portion is moving horizontally when temporarily coming into contact with the cam during reconfiguration of the seatback for passenger seating.

4. The rear structure of claim 1 wherein said cam is provided by a protruding contact face extending from said bridge plate undersurface.

5. The rear structure of claim 4 wherein the protruding contact face is a part of a reinforcement attached to the bridge plate.

6. The rear structure of claim 1 wherein said cam transforms lateral movement of said seatback into vertical movement of said bridge plate.

* * * * *